United States Patent
Friedmann

(10) Patent No.: US 8,438,948 B2
(45) Date of Patent: May 14, 2013

(54) VEHICLE DRIVE

(75) Inventor: Oswald Friedmann, Lichtenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/358,789

(22) Filed: Jan. 26, 2012

(65) Prior Publication Data

US 2012/0190492 A1 Jul. 26, 2012

Related U.S. Application Data

(63) Continuation of application No. PCT/DE2010/000752, filed on Jun. 29, 2010.

(30) Foreign Application Priority Data

Jul. 28, 2009 (DE) .......................... 10 2009 035 094

(51) Int. Cl.
*F16H 37/06* (2006.01)
(52) U.S. Cl.
USPC .......................... 74/661; 74/665 A; 74/665 B
(58) Field of Classification Search .................... 74/661, 74/665 R, 665 A, 665 B
See application file for complete search history.

(56) References Cited

U.S. PATENT DOCUMENTS

| | | | | |
|---|---|---|---|---|
| 2,427,135 | A * | 9/1947 | Guier | 74/661 |
| 3,782,223 | A * | 1/1974 | Watson | 74/665 L |
| 4,392,393 | A * | 7/1983 | Montgomery | 74/661 |
| 5,028,828 | A * | 7/1991 | Felkai et al. | 310/83 |
| 6,081,042 | A | 6/2000 | Tabata et al. | |
| 7,270,030 | B1 * | 9/2007 | Belloso | 74/661 |
| 7,317,259 | B2 * | 1/2008 | Yamauchi | 290/40 C |
| 2005/0126173 | A1 | 6/2005 | Anderson | |

FOREIGN PATENT DOCUMENTS

| | | |
|---|---|---|
| DE | 576236 | 8/1931 |
| DE | 2828298 | 1/1980 |
| DE | 3145381 | 5/1983 |
| DE | 4110162 | 10/1992 |
| DE | 4135233 | 4/1993 |
| DE | 4210258 | 9/1993 |
| GB | 2345041 | 6/2000 |

* cited by examiner

*Primary Examiner* — Ha D. Ho
(74) *Attorney, Agent, or Firm* — Simpson & Simpson, PLLC

(57) ABSTRACT

A vehicle drive including a transmission-engine arrangement with two drive units that are operatable independently of each other and include drive shafts arranged in the longitudinal direction of the vehicle, and with two transmission units, a respective one of the drive units forming a partial drive train with one of the transmission units, and a respective clutch device being arranged between the drive units and the transmission units within the partial drive trains. The clutch devices of the two partial drive trains are arranged to be offset relative to each other in the longitudinal direction of the vehicle to be capable of being arranged with an overlap as viewed in the transversal direction of the vehicle.

6 Claims, 4 Drawing Sheets

VEHICLE DRIVE

CROSS-REFERENCE TO RELATED APPLICATIONS

This application is filed under 35 U.S.C. §120 and §365(c) as a continuation of International Patent Application No. PCT/DE2010/000752 filed Jun. 29, 2010, which application claims priority from German Patent Application No. DE 10 2009 035 094.2 filed Jul. 28, 2009, which applications are incorporated herein by reference in their entireties.

FIELD OF THE INVENTION

The present invention relates to a vehicle drive, in particular to a front wheel vehicle drive.

An advantageous feature in terms of the reduction of fuel consumption of a combustion engine is to dimension the combustion engine for a constant load and a relatively narrow output range, respectively, to ensure corresponding optimization. In known drive assemblies for vehicles, however, this feature is impossible to implement.

BACKGROUND OF THE INVENTION

German Patent Application No. DE 3 145 381 A1 discloses a transmission-engine arrangement for fuel-saving purposes wherein a single combustion engine is subdivided into two or more autonomous partial combustion engines by subdividing the crankshaft into two or more crankshaft portions that can be activated and connected as a function of the desired torque.

On the one hand, subdividing a combustion engine into two small combustion engines results in an optimized dimensioning of the individual combustion engines and a corresponding reduction of fuel consumption. Yet on the other hand, such a subdivided drive unit requires more installation space. However especially in applications that include longitudinally-mounted front engines, there is only a limited amount of installation space in the longitudinal direction of the vehicle, among other reasons because the vehicle may become very front-heavy, i.e. its center of gravity may shift too far towards the front side of the vehicle.

BRIEF SUMMARY OF THE INVENTION

Thus an object of the present invention is to provide a transmission/engine arrangement for reducing fuel consumption in vehicles whose drive trains are arranged in the longitudinal direction, and in particular in vehicles that have a longitudinally front arrangement.

In accordance with the invention, this object is attained by a vehicle drive, in particular a front wheel vehicle drive, with a transmission-engine arrangement including two drive units that are operatable independently of each other and include drive shafts that are arranged in the driving direction of the vehicle, and with two transmission units, a respective one of the drive units and one of the transmission units forming a partial drive train and a respective clutch device being arranged between the drive units and the transmission units within the partial drive trains, wherein the clutch devices of the two partial drive trains are offset relative to each other in the longitudinal direction of the vehicle to be capable of being arranged with an overlap as viewed in the transversal direction of the vehicle.

In accordance with the invention, the object is likewise attained by a vehicle drive, in particular a front wheel vehicle drive, including a transmission-motor arrangement with two drive units that are operatable independently of each other and have drive shafts that are arranged in the driving direction of the vehicle and with two transmission units, a respective one of the drive units forming a partial drive train with one of the transmission units and a clutch device being arranged between the drive units and the transmission units within the two partial drive trains, and the drive units being embodied as combustion engines, each of which is subdivided into two or more autonomous partial combustion engines by providing respective crank shafts that are subdividable into two or more crankshaft portions via a clutch device integrated into the crankshafts, the crankshaft portions being activatable depending on the desired torque.

The two vehicle drives of the invention described above can be used in combination.

In accordance with one embodiment of the vehicle drives of the invention, the torques fed to the partial drive trains are transmitted to the driven wheels of the vehicle via a differential with a differential shaft provided between the drive units and the clutch devices (arranged between the combustion engines and the transmission units) as viewed in the longitudinal direction of the vehicle.

Furthermore, the partial drive trains may be combined using a common output shaft that applies a total torque to the differential, which is connected to the driven wheels of the vehicle and, as viewed in the transversal direction of the vehicle, is arranged between the transmission input shafts or outside the transmission input shafts. The common output shaft may be arranged outside the transmission input shafts and adjacent to the differential as viewed in the transversal direction of the vehicle. As an alternative, the common output shaft may be arranged between the transmission input shafts as viewed in the transversal direction of the vehicle.

In accordance with the invention, the object is likewise attained by a vehicle drive, in particular a front wheel vehicle drive, including a transmission-motor arrangement with two drive units that are operatable independently of each other and have drive shafts that are arranged in the driving direction of the vehicle, with two transmission units, each of which forms a partial drive train with one of the transmission units, with a respective clutch assembly arranged between the drive units and the transmission units within the two partial drive trains, and with a common differential connected to the partial drive trains and arranged between the two drive trains as viewed in the transversal direction of the vehicle. This vehicle drive of the invention may likewise be used in combination with the vehicle drives of the invention described above.

The vehicle drive described herein may include clutch devices between the drive units and the transmission units within the partial drive trains; a differential shaft may be arranged between the drive units and the clutch assemblies as viewed in the longitudinal direction of the vehicle. The partial drive trains may be connected to the differential by respective separate output shafts, with the differential transmitting a total torque to the driven wheels of the vehicle. In this context both output shafts may be arranged between the transmission input shafts as viewed in the transversal direction of the vehicle. In particular, the output of the two partial drive trains may be combined in the differential housing by using two individual ring gears instead of a common ring gear.

The object of the invention is likewise attained by a vehicle drive, in particular a front wheel drive, including a transmission-motor arrangement with two drive units that are operateable independently of each other and include drive shafts that are arranged in the driving direction of the vehicle, with a common transmission unit, one of the drive units being connected to the common transmission unit via a clutch device, and the drive shafts of the drive units being connected to each other via an external switchable and/or controllable connecting device. In this context, an external connecting device is understood to be a connecting device that is arranged outside the engine blocks of the combustion engines yet between the crankshafts of these combustion engines. The connecting device may comprise a clutch device connected to a crankshaft of a first one of the combustion engines, a first gear connected to the clutch device, an intermediate gear arranged on an intermediate shaft, and a second gear connected to a crankshaft of a second one of the combustion engines.

BRIEF DESCRIPTION OF THE DRAWINGS

The present invention will be explained in more detail based on preferred exemplary embodiments with reference to the associated drawings, in which.

DETAILED DESCRIPTION OF THE INVENTION

Figure 1:
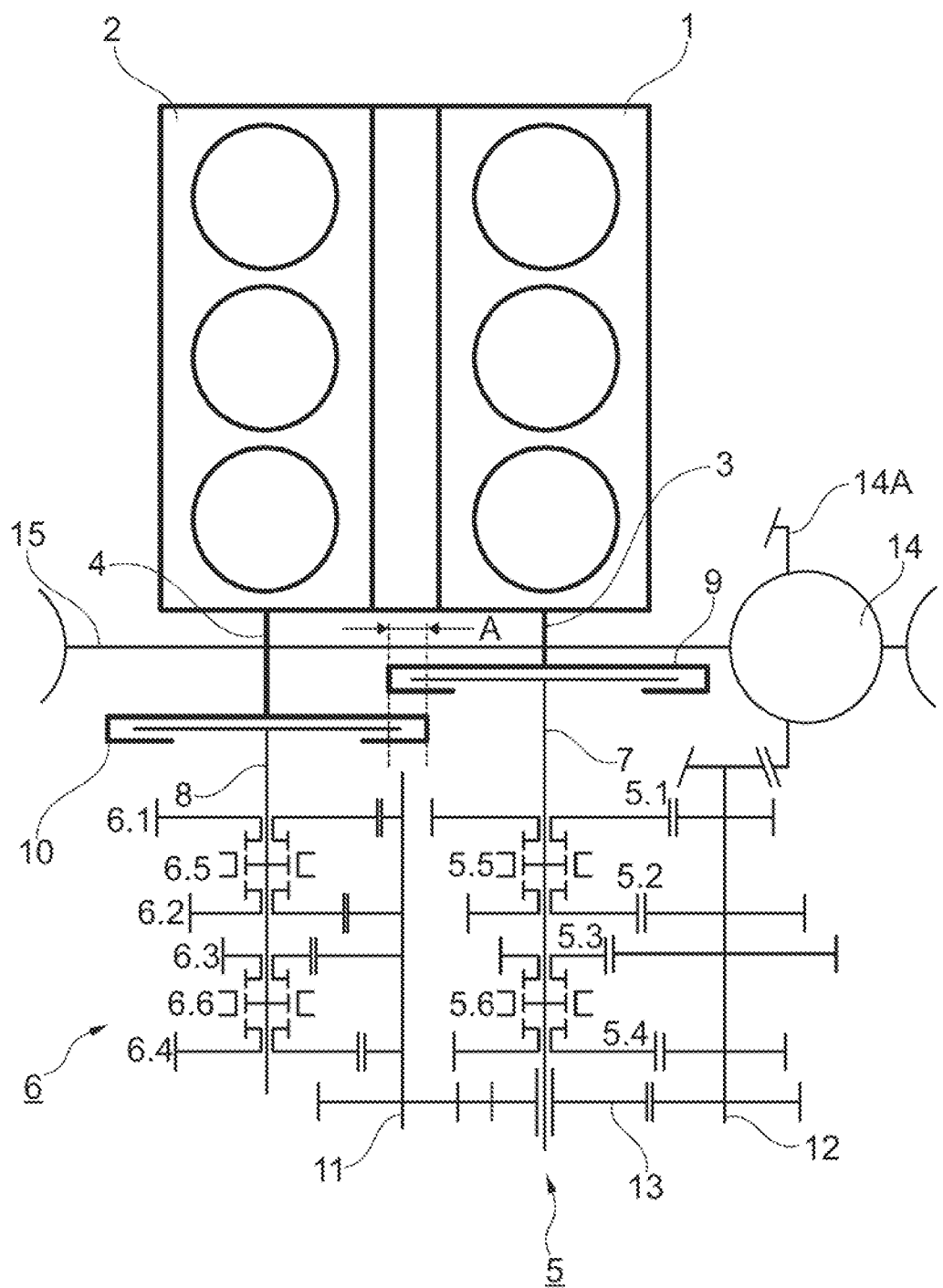
FIG. 1 illustrates a longitudinal front arrangement of a drive train including two three-cylinder in-line engines and a double clutch transmission.

The exemplary embodiment illustrated in FIG. 1 comprises two three-cylinder in-line engines 1, 2 in a longitudinal front arrangement of a vehicle. The crankshafts 3, 4 of the three-cylinder in-line motors 1, 2 are arranged in the longitudinal direction of the vehicle. Behind the combustion engines 1 and 2 in this longitudinal front arrangement, there are transmissions 5, 6, which include transmission input shafts 7, 8 that are connected to the respective combustion engines 1, 2 via (single) clutches 9, 10.

A respective one of the combustion engines forms a partial drive train with the associated clutch and the associated transmission; the partial drive trains are arranged in the longitudinal direction of the vehicle. The drive train shown on the left side in FIG. 1 comprises combustion engine 2, clutch 10, and transmission 6, and the drive train shown on the right side in FIG. 1 comprises combustion engine 1, clutch 9, and transmission 5.

Torque provided by the combustion engine 2 arranged on the left side in FIG. 1 is introduced to the transmission 6 via the clutch and the transmission input shaft 8. In an example embodiment, transmission 6 comprises four gear stages 6.1, 6.2, 6.3, and 6.4, two of which are connectable to the transmission input shaft 8 via a shifting and synchronization device 6.5 and 6.6. The number of gear stages and the transmission ratio of the respective gear stages are of course adaptable to the respective application. Torque introduced via transmission input shaft 8 is transmitted to a transmission output shaft 11 of the transmission 6 that is arranged on the left side in FIG. 1 via one of gear stages 6.1 to 6.4 in connection with the respective shifting and synchronization device 6.5 and 6.6.

Torque provided by the combustion engine 1 that is arranged on the right side in FIG. 1 is transmitted to transmission 5 via clutch 9 and transmission input shaft 7. In an example embodiment, transmission 5 arranged on the right side in FIG. 1 in turn has four gear stages 5.1, 5.2, 5.3, and 5.4 that are transmittable to a transmission output shaft 12 via shifting and synchronization device 5.5 and 5.6.

The transmission output shaft 11 of the transmission 6 arranged on the left side in FIG. 1 is connected to the output shaft 12 of the transmission 5 arranged on the right side in FIG. 1 via a gear stage including gear 13, which may be supported for rotation on the transmission input shaft 7 of the transmission 5 arranged on the right side in FIG. 1. The output shaft 12 arranged outside the transmissions 5, 6 in FIG. 1 thus summates the torques provided by the combustion engines 1 and 2 transmits a total torque to a differential 14.

In the present longitudinal front arrangement, a differential shaft 15 extending from the differential 14 is arranged in front of the clutches as viewed in the driving direction.

The differential shaft 15 is connected to universal-joint shafts (not illustrated in FIG. 1) for transmitting the torque to the driven wheels.

In the arrangement of the double engine 1, 2 shown in FIG. 1, which includes a power shift transmission 5, 6, the common power take-off (differential 14) is located adjacent to the motors 1, 2 and/or adjacent to the clutch devices 9, 10.

In the present embodiment, clutch devices 9, 10 (which may be combined with flywheels, in particular dual-mass flywheels (DMFWs), or may be embodied as one integral component with flywheels, in particular, dual-mass flywheels) are offset or staggered relative to each other as viewed in the longitudinal (=axial) direction of the vehicle. Due to this staggered arrangement of the clutches 9, 10 in the longitudinal direction of the vehicle, the combustion engines 1, 2 may be arranged closer to each other because a radial overlap (illustrated as area A in FIG. 1) as viewed in the transversal direction of the vehicle is possible between the clutches 9, 10. In a corresponding manner, the crankshafts of the two engines 1, 2 may be arranged close to each other because in this arrangement the two flywheels or DMFWs and the associated clutches or the clutches themselves are not located in the same plane but behind each other.

Figure 2:
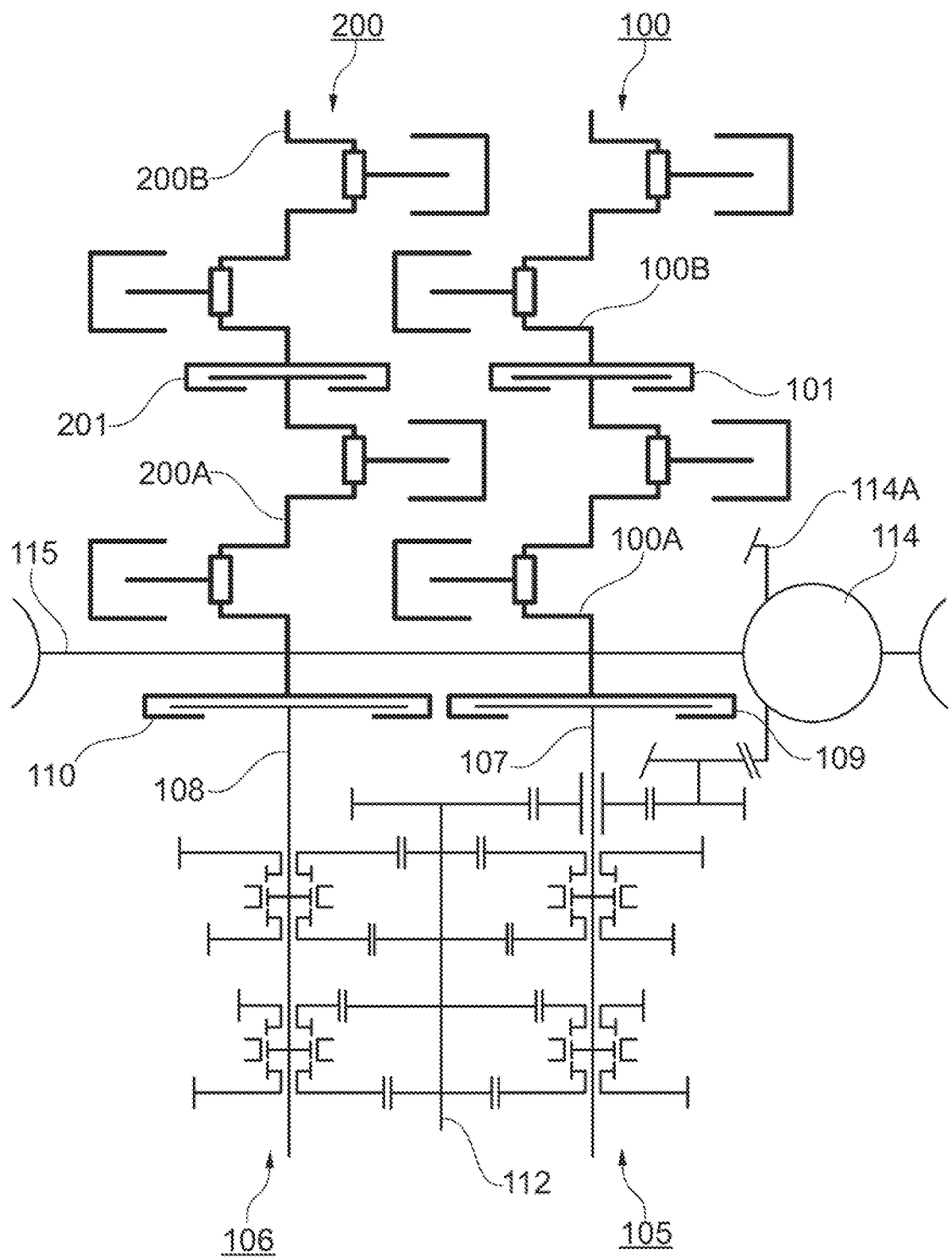
FIG. 2 illustrates a longitudinal front arrangement of a drive train including four two-cylinder flat engines and a double clutch transmission.

The exemplary embodiment shown in FIG. 2 includes a further longitudinal front area arrangement of two engines 100, 200, of which only the respective crankshafts and cylinders are shown. The crankshafts of the engines 100, 200 are subdividable into two crankshaft portions 100A, 100B and 200A 200B, respectively, via clutch devices 101, 201. Thus the exemplary embodiment in FIG. 2 actually represents a quadruple engine including crankshaft portions 100A, 100B, 200A, 200B.

Like the embodiment in FIG. 1, the embodiment in FIG. 2 also comprises two clutches 109, 110. The clutch 109 arranged on the right side in FIG. 2 connects crankshaft portion 100A to the transmission 105 shown on the right side in FIG. 2. The clutch 110 arranged on the left side in FIG. 2 connects crankshaft portion 200A to the transmission 106 arranged on the left side in FIG. 2.

Each of the transmissions 105, 106 comprises a respective transmission input shaft 107, 108, each of which rotatably supports idler gears that are connectible to the transmission input shafts 107, 108 to be fixed against rotation via associated shifting and synchronization devices. In the given example, both transmissions 105, 106 comprise four gear stages, which are of course adaptable to the respective application in terms of their number and transmission ratio. In the given example, a common output shaft 112 that is in operative connection with the gear stages of both transmissions 105, 106 is provided and is arranged between the transmissions 105 and 106 as viewed in the transversal direction of the vehicle. The common output shaft 112 is connected to a differential 114 via a gear supported on transmission input shaft 107. A differential shaft 115 extending from the differential 114 is arranged between the combustion engine 100, 200 and the clutches 109, 110 as viewed in the longitudinal direction of the vehicle.

In the longitudinal front arrangement shown in FIG. 2 of the drive train including a quadruple engine and a power shift transmission, the common power take-off of the transmissions 105, 106, i.e. the differential 114, is likewise arranged adjacent to the combustion engines 100, 200 and/or adjacent to the clutches 109, 110, respectively. In this example, the combination of the outputs of the two partial transmissions 105, 106 occurs in the common output shaft 112. However, it may likewise occur in the differential 114 or even in the differential housing itself by using two small ring gears instead of one large ring gear 114A. Depending on the respective load condition of the drive train, portion 100A of motor 100 and/or portion 200A of combustion engine 200 may be in operation. If a higher load is requested, the remaining portions 100B and/or 200B may be activated in addition to the respective portion 100A, 200A using the clutches 101, 102. FIG. 2 accordingly illustrates a longitudinal front arrangement including four flat twin engines and a power shift transmission.

Figure 3:
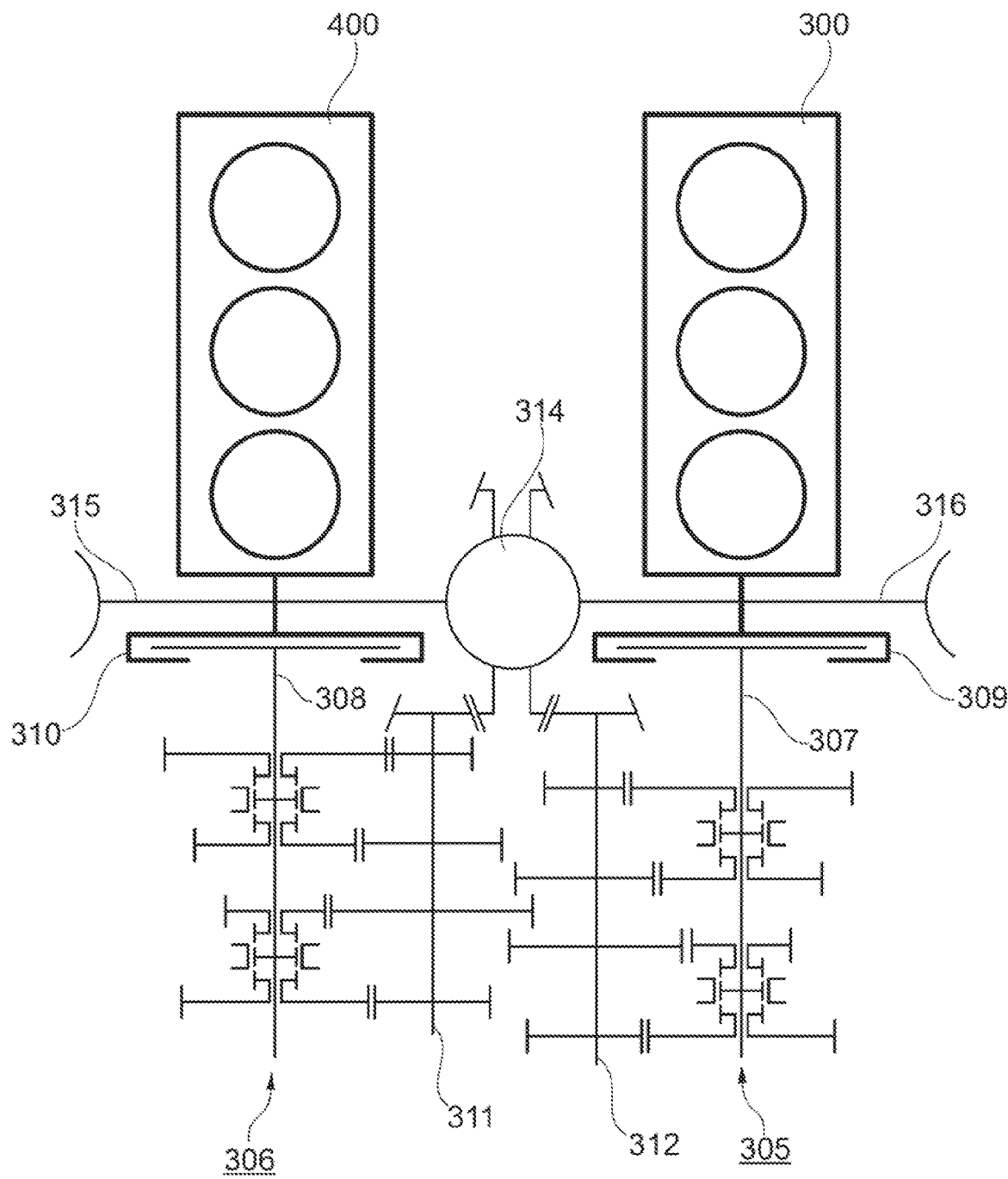
FIG. 3 illustrates a longitudinal front arrangement of a drive train including two three-cylinder in-line engines and a double clutch transmission.

In a manner similar to the exemplary embodiment in FIG. 1, the exemplary embodiment shown in FIG. 3 comprises two three-cylinder in-line engines 300, 400, which are connected to transmissions 305, 306 via clutch devices 309, 310. In the given example, each of the transmissions comprises four gear stages that have idler gears rotatably arranged on one of the transmission input shafts 307 and 308 and connectable to these transmission input shafts 307, 308 in a way to be fixed against rotation via shifting and synchronization devices. The gear stages of the transmission 306 arranged on the left side in FIG. 3 mesh with a transmission output shaft 311, which is connected to a differential 314 via a spur gear in connection with a first ring gear. A first differential shaft 315 extends between the engine 400 arranged on the left side in FIG. 3 and the clutch 310 arranged on the left side in FIG. 3.

The gears of the gear stages of the transmission 305 arranged on the right side in FIG. 3 mesh with gears of a second transmission output shaft 312, which is likewise connected to the differential 314 via a spur gear in connection with a second ring gear. A second differential shaft 316 extends between the engine 300 arranged on the right side in FIG. 3 and the clutch 309 arranged on the right side in FIG. 3.

In the illustrated design, the differential 314 is arranged between the motors 300 and 304 and/or between the clutches 309 and 310. Separate transmission input shafts 311 and 312 are connected to the differential 314 independently of each other. Thus the output of the two partial transmissions only occurs in the differential housing of the differential 314 by using two smaller ring gears instead of one large ring gear (as shown in FIG. 1 or 2).

Figure 4:
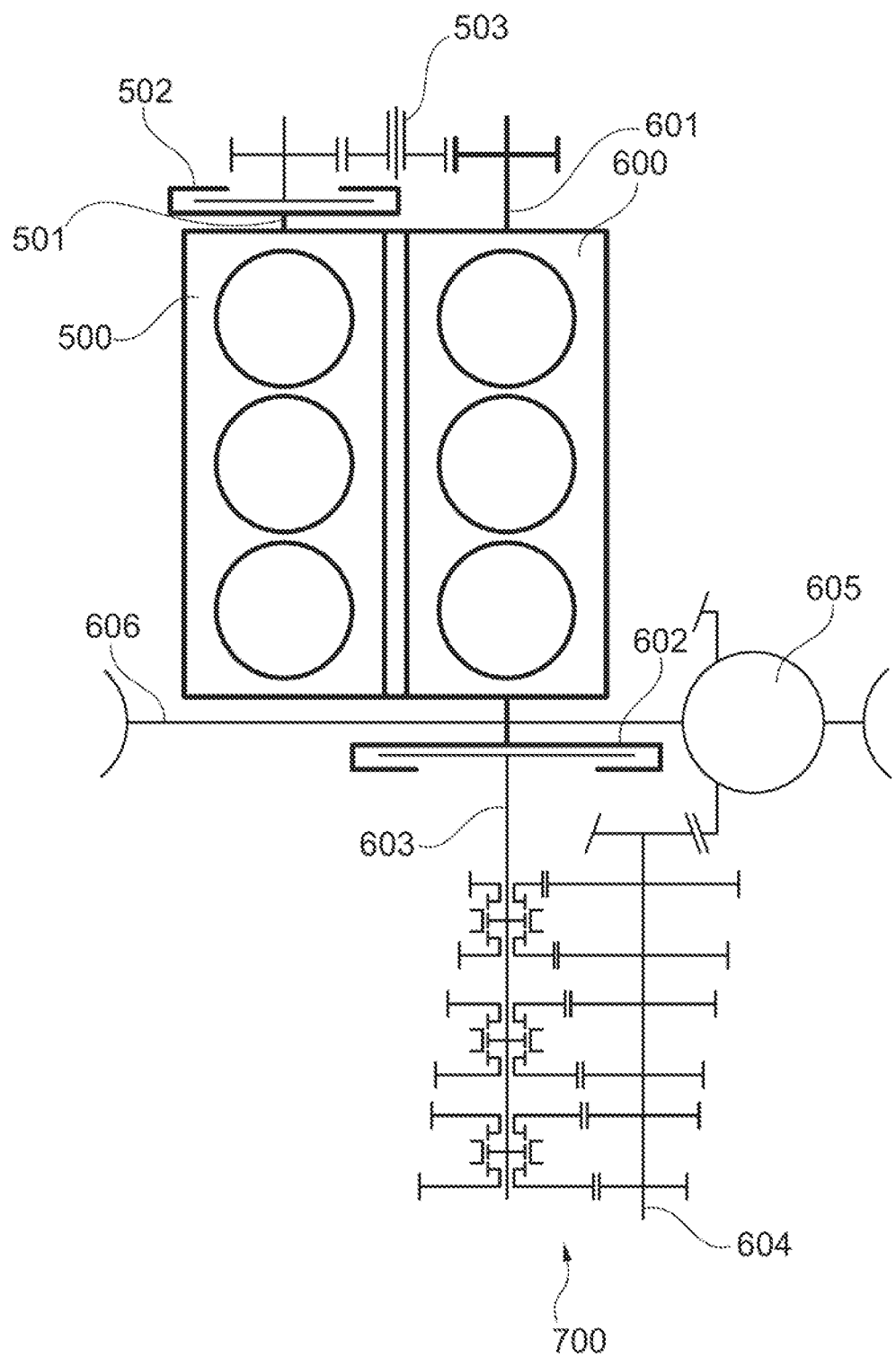
FIG. 4 illustrates a longitudinal front arrangement of a drive train including two three-cylinder in-line engines and a manual transmission.

FIG. 4 illustrates another exemplary embodiment of a longitudinal front arrangement including two three-cylinder in-line engines and a manual transmission with combustion engines 500 and 600. Via a clutch device 502 and a device for reversing the direction of rotation (including an intermediate gear 503 mounted on an intermediate shaft), a crankshaft 501 of the engine 500 arranged on the left side in FIG. 4 is connected to a crankshaft 601 of the engine 600 arranged on the right side in FIG. 4.

The engine 600 arranged on the right side in FIG. 4 is connected to the transmission input shaft 603 of transmission 700 via a clutch 602. Transmission 700 comprises multiple (in the given example, 6) transmission stages to transmit a torque introduced via the transmission input shaft 603 to the transmission output shaft 604. The transmission output shaft 604 is in operative connection with the differential 605 via a spur gear and a ring gear.

In the present example, the differential shaft 606 is arranged between the engine 600 arranged on the right side in FIG. 4 and the clutch 602 arranged on the right side in FIG. 4.

In the arrangement shown in FIG. 4 the vehicle is thus generally driven by the combustion engine 600 arranged on the right side. Combustion engine 500 can be connected and activated via clutch 501.

The exemplary embodiments described above have in common that other types of transmissions such as a planetary gear set or a CVT (continuously variable transmission) may be used instead of an auto shift transmission (FIGS. 1 to 3) or a manual transmission (FIG. 4). The number of gear stages can be chosen as desired.

In the present application, reference has been made to "clutches". In the context of the present invention, a "clutch" is understood to include single clutches as well as a combination of a clutch and a flywheel or dual-mass flywheel. Clutch and flywheel may form an assembly connected, for instance, by a system of interlocking teeth or a screw connection, or they may form an integral component.

The features of the exemplary embodiments in accordance with the various arrangements described with reference to FIGS. 1 to 3 and the numbers of transmission output shafts as well as the type of the corresponding connection to the differential arranged between the engines or adjacent to the engines are interchangeable.

All exemplary embodiments described above with reference to FIGS. 1 to 4 include an arrangement with a twin or quadruple engine and a power-shiftable transmission in which the differential shaft is located in front of the clutches.

A common feature of the exemplary embodiments shown in FIGS. 1 to 3 is that the common power take-off of the two transmission halves is located between or adjacent to the two engines.

The exemplary embodiment of FIG. 1 shows that the crankshafts of the two motors may be close to each other if the two flywheels or DMFWs including the associated clutches or the clutches, respectively, are not located in a common plane but in staggered formation behind each other.

In accordance with the exemplary embodiment of FIG. 3 the combination of the outputs of the two partial transmissions occurs in the differential housing by using two smaller ring gears instead of one large one.

In the exemplary embodiment shown in FIG. 2, the two engines may additionally be equipped with a crankshaft disconnect clutch at the center to be capable of using a total of 3 or 4 autonomous engines depending on the required output.

In the arrangement shown in FIG. 4, the disconnect clutch for the two engines may be located at the other end of the engine. Such an arrangement is particularly recommended if a manual transmission is used.

The present invention thus relates to the principle twin engine including a power shift transmission in a longitudinal front arrangement of the drive train.

LIST OF REFERENCE NUMERALS 1 three-cylinder in-line engine
2 three-cylinder in-line engine
3 crankshaft
4 crankshaft
5 transmission 5.1 gear stage
5.2 gear stage
5.3 gear stage
5.4 gear stage
6 transmission
6.1 gear stage
6.2 gear stage
6.3 gear stage
6.4 gear stage
6.5 shifting and synchronization device
6.6 shifting and synchronization device
7 transmission input shaft
8 transmission output shaft
9 (single) clutch
10 (single) clutch
11 transmission input shaft
12 transmission input shaft
13 gear
14 differential
15 differential shaft
100 engines
100A crankshaft portion
101 clutch device
105 transmission
106 transmission
107 transmission input shaft
108 transmission input shaft
109 clutch
110 clutch
112 output shaft
114 differential
115 differential shaft
200 engines
200A portion
200B crankshaft portion
201 clutch device
300 three-cylinder in-line engines
304 engine
305 transmission
306 transmission
307 transmission input shaft
308 transmission input shaft
309 clutch devices
310 clutch devices
311 transmission output shaft
312 transmission output shaft
314 differential
315 differential shaft
316 differential shaft
400 three-cylinder in-line engines
500 combustion engine
501 crankshaft
502 clutch device
503 intermediate gear
600 combustion engine
601 crankshaft
602 clutch
603 transmission input shaft
604 transmission output shaft
605 differential
606 differential shaft
700 transmission

What I claim is:

1. A vehicle drive, including a transmission-engine arrangement with two drive units that are operatable independently of each other and include drive shafts arranged in the longitudinal direction of the vehicle, and with two transmission units, a respective one of the drive units forming a partial drive train with one of the transmission units, and a respective clutch device being arranged between the drive units and the transmission units within the partial drive trains, wherein the clutch devices of the two partial drive trains are arranged to be offset relative to each other in the longitudinal direction of the vehicle to be capable of being arranged with an overlap as viewed in the transversal direction of the vehicle.

2. A vehicle drive as set forth in claim 1, including a transmission-engine arrangement with two drive units that are operatable independently of each other and include drive shafts arranged in the driving direction of the vehicle, and with two transmission units, a respective one of the drive units forming a partial drive train with one of the transmission units, and a respective clutch device being arranged between the drive units and the transmission units within the two partial drive trains, wherein the drive units are designed as combustion engines that are subdivided into two or more autonomous partial combustion engines by providing respective crankshafts that are subdividable into two or more crankshaft portions via clutch devices integrated into the respective crankshafts, the crankshaft portions being activatable depending on the desired torque.

3. The vehicle drive as set forth in claim 1, wherein torques introduced into the partial drive trains are transmitted to driven wheels of the vehicle via a differential, a differential shaft being provided, as viewed in the longitudinal direction of the vehicle, between the drive units and the clutch devices arranged between a combustion engines and the transmission units.

4. The vehicle drive as set forth in claim 3, wherein the partial drive trains are combined via a common output shaft that transmits a total torque to the differential connected to the driven wheels of the vehicle.

5. The vehicle drive as set forth in claim 4, wherein the common output shaft is arranged outside the transmission input shafts and adjacent to the differential as viewed in the transversal direction of the vehicle.

6. The vehicle drive as set forth in claim 4, wherein the common output shaft is arranged between the transmission input shafts as viewed in the transversal direction of the vehicle, and wherein the differential is arranged outside the transmission input shafts as viewed in the transversal direction of the vehicle.

* * * * *